United States Patent [19]

Kim

[11] Patent Number: 5,870,322

[45] Date of Patent: Feb. 9, 1999

[54] MULTIPLIER TO SELECTIVELY PERFORM UNSIGNED MAGNITUDE MULTIPLICATION OR SIGNED MAGNITUDE MULTIPLICATION

[75] Inventor: Jae-Yoon Kim, Suwon, Rep. of Korea

[73] Assignee: Samsung Electronics Co., Ltd., Kyungki-Do, Rep. of Korea

[21] Appl. No.: 651,482

[22] Filed: May 22, 1996

Related U.S. Application Data

[63] Continuation-in-part of Ser. No. 584,213, Jan. 4, 1996, abandoned.

[30] Foreign Application Priority Data

May 22, 1996 [KR] Rep. of Korea .................. 1995-12754

[51] Int. Cl.$^6$ .................................................. G06F 7/52
[52] U.S. Cl. ........................... 364/760.04; 364/760.01; 364/757
[58] Field of Search .................... 364/760.04, 760.02, 364/759, 758, 757, 760.01

[56] References Cited

U.S. PATENT DOCUMENTS

| | | | |
|---|---|---|---|
| 4,926,371 | 5/1990 | Vassiliadis | 364/760.01 |
| 5,226,003 | 7/1993 | Nagamatsu | 364/760 |
| 5,473,559 | 12/1995 | Makino | 364/758 |
| 5,506,799 | 4/1996 | Nakao | 364/760.01 |
| 5,544,084 | 8/1996 | Fukumoto | 364/760.02 |

*Primary Examiner*—David H. Malzahn
*Attorney, Agent, or Firm*—Pillsbury Madison & Sutro LLP

[57] ABSTRACT

A multiplier for selectively performing an unsigned magnitude multiplication or a signed magnitude multiplication with a modified Booth algorithm for a multiplication operation. It includes a selection unit which provides an extension bit for performing an unsigned magnitude multiplication in a signed magnitude multiplication which is expressed by a two's complement format, and a partial product generator for performing a sign digit operation increased by the extension bit. It preferably includes a carry look-ahead adder for generating and propagating a look-ahead carry.

4 Claims, 2 Drawing Sheets

1

MULTIPLIER TO SELECTIVELY PERFORM UNSIGNED MAGNITUDE MULTIPLICATION OR SIGNED MAGNITUDE MULTIPLICATION

This application is a continuation-in-part of application Ser. No. 08/584,213, filed Jan. 4, 1996, now abandoned.

BACKGROUND OF THE INVENTION

(1). Field of Invention

The present invention relates to a multiplier, more particularly, to a multiplier for selectively performing an unsigned magnitude multiplication, or a signed magnitude multiplication with a modified Booth algorithm.

(2). Description of the Prior Art

Multiplication is an essential operation in a digital signal processing (hereinafter referred to as a DSP) operation to process image data.

In designing a multiplier, an operation unit such as an arithmetic logic unit (hereinafter referred to as an ALU) of a central processing unit (hereinafter referred to as a CPU) needs a multiplier enabling selective performance of an unsigned magnitude multiplication or a signed magnitude multiplication.

A method for implementing the unsigned magnitude multiplication or the signed magnitude multiplication in the ALU is to use both an unsigned magnitude multiplier and a signed magnitude multiplier. However, this method requires more circuit area because of the use of two multipliers.

Another method for implementing the unsigned magnitude multiplication or the signed magnitude multiplication in the ALU is to make an additional circuit for compensating the difference between an signed magnitude product and an unsigned magnitude product. This method adds the remaining bits, except the most significant bit of other operand, to a final product, when the most significant bit of a certain operand is "1". However, using this method it is difficult to obtain a square layout which is considered to be a benefit of an array multiplier.

A multiplier for performing an unsigned magnitude multiplication or a two's complement multiplication is described in the U.S. Pat. No. 5,153,850 issued on Aug. 24, 1990, entitled "METHOD AND APPARATUS FOR MODIFYING TWO'S COMPLEMENT MULTIPLIER TO PERFORM UNSIGNED MAGNITUDE MULTIPLICATION". The multiplier described in the United States Patent selectively operates the two's complement multiplication or unsigned magnitude multiplication, corrects the two's complement product by an additional circuit, and then achieves an unsigned magnitude product.

Regarding an algorithm for the multiplication, a modified Booth algorithm is described in *DIGITAL CMOS CIRCUIT DESIGN* (pp. 211–221) written by Macro Annaratone.

The modified Booth algorithm is a type of a recording algorithm, which divides a first operand into predetermined bit-pairs, achieves a partial product as an intermediate result after performing an operation corresponding to respective bit-pairs to a second operand, adds the generated partial product corresponding to the respective bit-pairs to the other operand, and achieves a final result by multiplying between the two operands. In addition, the modified Booth algorithm considers that "0" has no effect on the multiplication, and improves the operating speed of the multiplication.

FIG. 1 is a block diagram of a conventional two's complement multiplier using a Booth algorithm.

As shown in FIG. 1, a general two's complement multiplier comprises an encoder 1, a sign propagate unit 2, a shift and invert unit 3, first to third partial product generators 4,5, and 6, and a carry look-ahead adder 7. The multiplier shown in FIG. 1 is an eight-bit by eight-bit multiplier, "A" is defined as a multiplicand of eight-bit, and "B" is defined as a multiplier of eight-bit.

The operand "B" is inputted to the encoder 1. The encoder 1 codes a bit-pair of the operand "B" divided in every 3 bits, and forms sets of recoded digits (i.e., −2x, −1x, 0x, +1x, and +2x) corresponding to the bit-pair.

Each recoded digit of the recoded digit sets is propagated to one of the unit 3 and three partial product generators 4,5, and 6, respectively. The unit 3 and three partial product generators 4,5, and 6 perform the corresponding operation in relation to the operand "A".

The resulting operation is outputted to outside through the carry look-ahead adder 7. The purpose of the sign propagate unit 2 is to process the extended sign bit of the multiplicand.

Such a multiplier performs a signed magnitude multiplication expressed as two's complement, but cannot perform an unsigned magnitude multiplication.

SUMMARY OF THE INVENTION

An object of the present invention is to provide a multiplier for selectively performing an unsigned magnitude multiplication or a signed magnitude multiplication with a modified Booth algorithm for a multiplication operation. Thus, the multiplier of the present invention is capable of solving the problem in the prior art.

In order to achieve this object, the present invention includes: an encoder which receives a first operand, codes bit-pairs of the operand, and forms a recoded digit corresponding to each bit-pair; a shift and invert unit for forming a partial product after performing both a shifting operation and a inverting operation of a second operand by the recoded digit propagated from the encoder; a first partial product generator which performs an operation with the second operand according to the recoded digit propagated from the encoder, and generates a partial product by adding the operation result to the predetermined partial product from the shift and invert unit, respectively; second to fourth partial product generators which are sequentially connected to the output terminal of the first partial product generator, and generate partial product by addition between the output data of a previous stage and the operation result regarding the second operand by the propagated recoded digit; a sign propagate unit which is connected to the shift and invert unit and the first to fourth partial product generators for applying a signal, and accumulates the partial products regarding an extended sign bit of second operand; and a selection unit which judges whether a multiplication is an unsigned magnitude multiplication or a signed magnitude multiplication by using an inputted selection signal, and offers the extended sign bit to the two operands when the multiplication is the unsigned magnitude multiplication, respectively.

The multiplier of the present invention further includes a carry look-ahead adder which receives which are outputtted from the shift and invert unit and the first to third partial product generators, and a sum and a carry which are outputted from the fourth partial product generator as an input, and then accumulates them.

DETAILED DESCRIPTION OF THE PREFERRED EMBODIMENT

A preferred embodiment of the present invention will become apparent from a study of the following detailed description, when viewed in light of the accompanying drawings.

Figure 1:
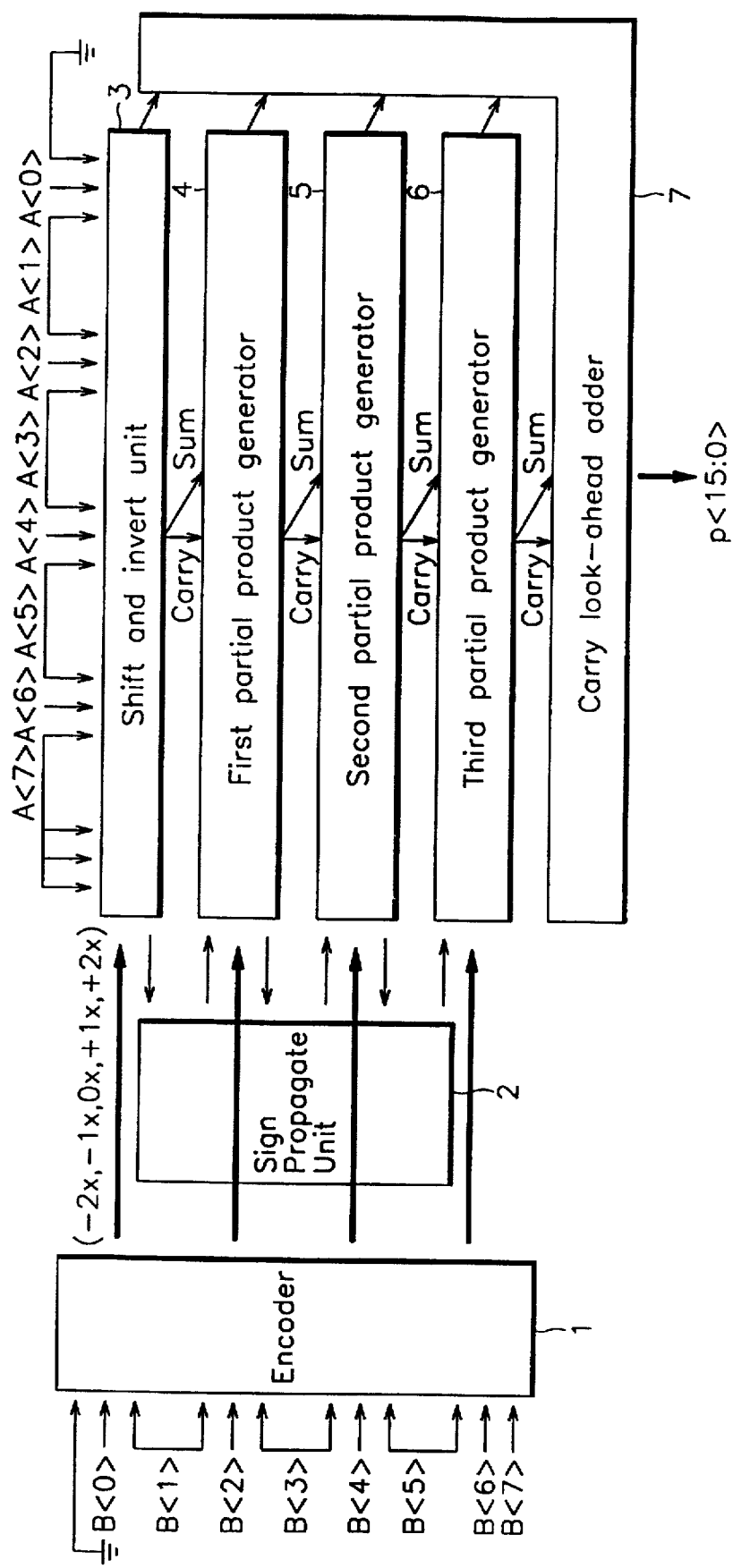
FIG. 1 is a block diagram of a general two's complement multiplier of the prior art.
Figure 2:
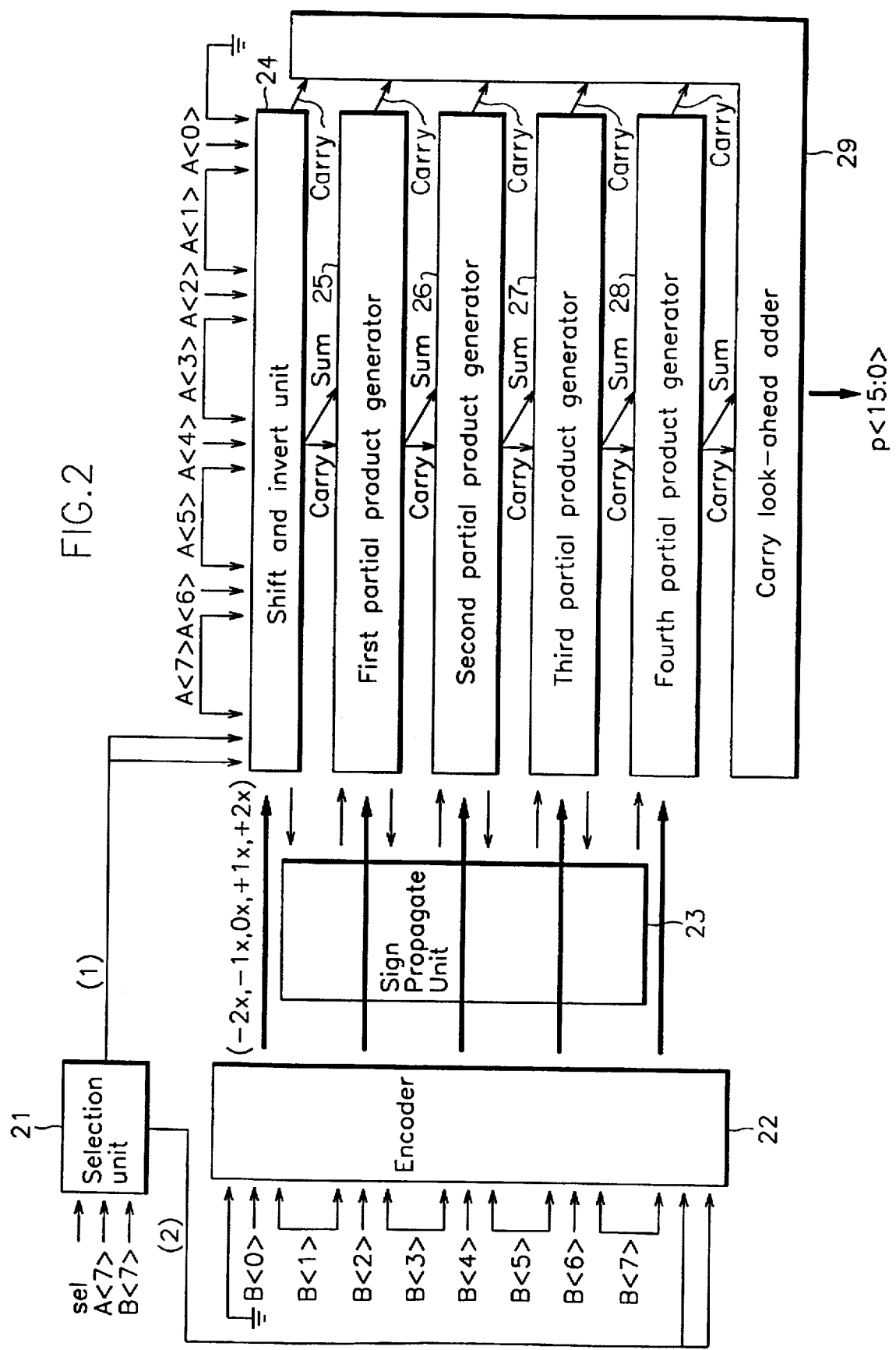
FIG. 2 is a block diagram of a multiplier for selectively performing an unsigned magnitude multiplication or a signed magnitude multiplication in accordance with a preferred embodiment of the present invention.

Before the multiplier in accordance with the preferred embodiment of the present invention is explained, which is shown in FIG. 2, the following description first explains a multiplying operation process applied to a preferred embodiment of the present invention, for example, an eight-bit by eight-bit multiplication.

In case of using one operand "A" and another operand "B", the following expression explains (−4)×(−2) as a signed number, unsigned number, and binary number.

| A × B | |
|---|---|
| (−4) × (−2) | signed number format |
| +252 × +254 | unsigned number format |
| 1111 1100 × 1111 1110 | binary number format |

The above signed magnitude multiplication process is described in the following Table A.

TABLE A

| x | | A | 11 | 11 | 11 | 00 | | |
|---|---|---|---|---|---|---|---|---|
|   | | B | 11 | 11 | 11 | 10 | | |
| (−2x) | 00 | 00 | 00 | 00 | 00 | 00 | 10 | 00 |
| ( 0x) | 00 | 00 | 00 | 00 | 00 | 00 | 00 | |
| ( 0x) | 00 | 00 | 00 | 00 | 00 | 00 | | |
| ( 0x) | 00 | 00 | 00 | 00 | 00 | | | |
| P | 00 | 00 | 00 | 00 | 00 | 00 | 10 | 00 |

In the above equation, (−2x) and (0x) on the left side of the middle block, which are recoded digits of the operand "B", respectively, bind three bits of the operand "B" with one bit-pair, and determine the corresponding sign digit of the bit-pair.

TABLE B

| Bit(i + 1) | Bit i | Bit(i − 1) | recoded digit |
|---|---|---|---|
| 0 | 0 | 0 | 0x |
| 0 | 0 | 1 | +1x |
| 0 | 1 | 0 | +1x |
| 0 | 1 | 1 | +2x |
| 1 | 0 | 0 | −2x |
| 1 | 0 | 1 | −1x |
| 1 | 1 | 0 | −1x |
| 1 | 1 | 1 | 0x |

Referring to Table B, the sign digit 0x adds "0" to the partial product, the sign digit 1x adds the operand "A" to the partial product, the sign digit 2x adds double the operand "A" (i.e., 2×A) to the partial product, the sign digit −1x subtracts the operand "A" from the partial product, and the sign digit −2x subtracts double the operand "A" (i.e., 2×A) from the partial product.

Accordingly, the recoded digits (i.e., 0x,0x,0x, and −2x) are sequentially achieved from a high-order bit pair of the operand "B". For achieving the "subtract −2×A" operation, the operation inverts A, adds 1, and shifts 1 bit to the left.

Furthermore, the four partial products are achieved through the above multiplication resulting in a decimal number 8 as the final product term P.

For the unsigned magnitude multiplication, two bits should be extended ahead of the input sign bit with '0', which are shown below in Table C.

TABLE C

| x | | A | 00 | 11 | 11 | 11 | 00 | | |
|---|---|---|---|---|---|---|---|---|---|
|   | | B | 00 | 11 | 11 | 11 | 10 | | |
| (−2x) | 11 | 11 | 11 | 10 | 00 | 00 | 10 | 00 | |
| ( 0x) | 00 | 00 | 00 | 00 | 00 | 00 | 00 | | |
| ( 0x) | 00 | 00 | 00 | 00 | 00 | 00 | | | |
| ( 0x) | 00 | 00 | 00 | 00 | 00 | | | | |
| (+1x) | 11 | 11 | 11 | 00 | | | | | |
| P | 11 | 11 | 10 | 10 | 00 | 00 | 10 | 00 | |

As shown in Table C, the recoded digit is generated by the bit-pair of the operand "B", the number of the partial product term becomes 5 as compared with the signed magnitude multiplication of which the number of the partial product is 4. The bit-pair of the operand "B" can be explained by the above multiplication as an example. The above multiplication divides the operand "B" (i.e., 0011111110) into five bit pairs (i.e., (001), (111), (111), (111), (100)). Each bit-pair uses one bit to be overlapped, respectively, if the last bit-pair has only two bits, the multiplication regards the third bit within the bit-pair as "0".

The unsigned magnitude multiplication has both an accurate result and an efficient process as compared with the general multiplication. The general multiplication is shown below in Table D.

TABLE D

| x | | | | | A | 11 | 11 | 11 | 00 |
|---|---|---|---|---|---|---|---|---|---|
|   | | | | | B | 11 | 11 | 11 | 10 |
|   |   |   |   |   | 00 | 00 | 00 | 00 | |
|   |   |   |   | 1 | 11 | 11 | 10 | 0 | |
|   |   |   |   | 11 | 11 | 11 | 00 | | |
|   |   |   | 1 | 11 | 11 | 10 | 0 | | |
|   |   | 11 | 11 | 11 | 00 | | | | |
|   | 1 | 11 | 11 | 10 | 0 | | | | |
|   | 11 | 11 | 11 | 00 | | | | | |
| 1 | 11 | 11 | 10 | 0 | | | | | |
| P | 11 | 11 | 10 | 10 | 00 | 00 | 10 | 00 | |

As shown in Table D, the general multiplication between two operands A and B 252 multiplies 252 by 254 as a decimal number. Accordingly, its final result is 64008 as a decimal number.

Next, referring to FIG. 2, a multiplier for selectively performing an unsigned magnitude multiplication or a signed magnitude multiplication in accordance with a preferred embodiment of the present invention is described below.

The multiplier according to a preferred embodiment of the present invention comprises a selection unit 21, an encoder 22, a sign propagate unit 23, a shift and invert unit 24, first to fourth partial product generators 25,26,27, and 28, and a carry look-ahead adder 29.

The multiplier shown in FIG. 2 is an eight-bit by eight-bit multiplier, "A" is defined as a multiplier eight-bit multiplicand, and "B" is defined as a eight-bit multiplier.

Referring to FIG. 2, the operand "B" is divided into 3 bits and is then inputted to the encoder 22. The encoder 22 codes a bit-pair of the operand "B" and forms sets of recoded digits (i.e., −2x, −1x, 0x, +1x, and +2x) corresponding to the bit-pair. The method of forming the sign digits is identical with that of an eight-bit by eight-bit multiplication.

Each sign digit of the sign digit sets is propagated to one of the unit 24 and four partial product generators 25,26,27, and 28, respectively. The unit 24 and four partial product generators 25,26,27, and 28 perform the corresponding operations with respect to the operand "A" according to the inputted sign digit.

The shift and invert unit 24 receives both the sign digit provided from the encoder 22 and the multiplicand "A" divided in every 3 bits, performs an operation corresponding to the sign digit with respect to each 3-bit of the multiplicand "A" and outputs a sum and carry resulting from the above operations to a first partial product generator 25. The partial product of the preferred embodiment of the present invention means sum and carry.

The first partial product generator 25 receives sum and carry from the shift and invert unit 24. The second to fourth partial product generators 26,27, and 28 receive the sum and carry sequentially from the first partial product generator 25. In addition, the partial product generators 25–28 receive the sign digit from the encoder 22, and also receive the multiplicand "A" divided in every 3 bits. The partial product generators 25–28 performs an operation corresponding to sign digit with respect to the multiplicand "A" add the above operation result to sum and carry which are received from the previous partial product, generate new sum and new carry, and finally thus output the next stage. To perform the above functions, the partial product generators 25–28 should include shift and invert means equal to the shift and invert unit 24, and addition means for adding sum and carry from the previous partial product generator to the output of the shift and invert means.

As to an operation corresponding to the respective recoded digits in the shift and invert unit 24 or the partial product generators 25–28, in case the recoded digit is −2x, to achieve the "subtract −2×A" operation from the operand "A", the operation adds data achieved by inverting A, adding 1, and shifting 1 bit to left to the partial product of the previous stage.

In case the sign digit is −1x, to achieve the "subtract −1×A" operation from the operand "A", the operation adds data achieved by inverting A, adding 1 to the partial product of the previous stage.

In case the sign digit is 0x, "0" is added to the partial product of the previous stage, and there is no real operation effect of the sign digit 0x.

In case the sign digit is +1x, the operand "A" is added to the partial product of the previous stage.

In case the sign digit is +2x, to achieve the "add +2×A" operation from the operand "A" the data achieved by shifting the operand "A" to the left by 1 bit, is added to the partial product of the previous stage.

The output data outputted from the shift and invert unit 24 and the first to fourth partial product generators 25–28 are outputted outside through the carry look-ahead adder 29.

The sign propagate unit 23 accumulates partial products according to the extended sign digit of both the multiplier "B" and the multiplicand "A" which are outputted from the shift and invert unit 24 and the first to fourth partial product generators 25–27, adds the partial products, and outputs the result through the above procedures to the fourth partial product generator 28.

The carry-look ahead adder 29 receives sum and carry outputted from the fourth partial product generator 28, and carry outputted from both the shift and invert unit 24 and the first to third partial product generators 25–27. Thus, the carry-look ahead adder 29 generates the output value of 16-bit by successively adding the received sums and carries, thereby increasing an operation speed of the signed magnitude multiplication.

The multiplier according to the preferred embodiment of the present invention can selectively performs an unsigned magnitude multiplication or a signed magnitude multiplication. For example, a selection signal (sel) being '1' selects the signed magnitude multiplication, and a selection signal (sel) being '0' selects the unsigned magnitude multiplication. Herein, when the selection signal (sel) is '1', the extended sign digits of both the multiplier "B" and the multiplicand "A" are always set as '0'. Accordingly, A<9>, A<8>, B<9> and B<8> outputted from the selection unit 21 become '0'. When the selection signal (sel) being '1', the extended sign digit value is determined by the most significant bits A<7> and B<7> which are sign bits of the multiplier "B" and the multiplicand "A". That is, when A<7> or B<7> is '1', A<9>A<8> and B<9>B<8> outputted from the selection unit 21 become '11'. When A<7> or B<7> is '0', A<9>A<8> and B<9>B<8> outputted from the selection unit 21 become '00'. Accordingly, the selection unit 21 provides the properly extended sign bit to both the multiplier "B" and the multiplicand "A" by controlling the selection signal (sel). As a result, the multiplier according to the present invention can perform the signed magnitude multiplication or the unsigned magnitude multiplication.

As described above, according to the preferred embodiment of the present invention, the present invention can provide a multiplier for selectively performing an unsigned magnitude multiplication or a signed magnitude multiplication with a modified Booth algorithm for a multiplication operation.

Especially, the present invention inputs the extended bit through the selection unit in the unsigned magnitude multiplication. Accordingly, the present invention can perform not only a signed magnitude multiplication but also an unsigned magnitude multiplication. Furthermore, since this invention has a simple circuit structure, it does not lower the operation processing speed, and it occupies a relatively small area in manufacturing the integrated circuit.

What is claimed is:

1. A multiplier for selectively performing an unsigned magnitude multiplication or a signed magnitude multiplication of two operands, comprising:

an encoder which receives one of the operands, codes bit-pairs of said one of the operands, and forms a recoded bit corresponding to each of said bit-pairs;

a shift and invert unit for forming a partial product after performing both a shifting operation and an inverting operation of the other of the operands corresponding to a sign bit propagated from the encoder;

a first partial product generator which respectively forms an operation result of the other of the operands corresponding to the recoded bit propagated from the encoder, and generates a first partial product by adding operation data and the partial product from the shift and invert unit, respectively;

a second partial product generator connected to an output terminal of said first partial product generator and which generates a second partial product using output data received from said output terminal of said first partial product generator and the operation result corresponding to the other operand by the recorded bit propagated from the encoder;

a third partial product generator connected to an output terminal of said second partial product generator and which generates a third partial product using output data received from said output terminal of said second partial product generator and the operation result corresponding to the other operand by the recorded bit propagated from the encoder;

a fourth partial product generator connected to an output terminal of said third partial product generator and which generates a fourth partial product using output data received from said output terminal of said third partial product generator and the operation result corresponding to the other operand by the recorded bit propagated from the encoder;

a sign propagate unit which is coupled to said encoder and connected to the shift and invert unit and to the first, second, third and fourth partial product generators for applying a signal, accumulating the partial products from the shift and invert unit and said first, second, third and fourth partial products corresponding to extended sign bits, and adding the partial products from the shift and invert unit and said first, second, third and fourth partial products; and a selection unit coupled to said shift and invert unit and said encoder which judges whether a multiplication is an unsigned magnitude multiplication or a signed magnitude multiplication by using an inputted selection signal, and provides the extended sign bits to the two operands when the multiplication is the unsigned magnitude multiplication.

2. The multiplier as defined in claim 1, wherein the partial products from the shift and invert unit and first, second, third and fourth partial product generators are sum and carry.

3. The multiplier as defined in claim 2, further comprising:

carry look-ahead adder which receives carries outputted from the shift and invert unit and the first, second, third and fourth partial product generators as inputs, and then accumulates them.

4. The multiplier as defined in claim 1, being arranged as an eight-bit by eight-bit multiplier.

* * * * *